United States Patent [19]

Yamagata et al.

[11] 4,226,718
[45] Oct. 7, 1980

[54] PROCESS FOR SEPARATING POLYVINYL ALCOHOL FROM ITS SOLUTION

[75] Inventors: Totaro Yamagata, Suzuka; Shuji Banno, Konan, Japan

[73] Assignee: Shikibo Limited, Osaka, Japan

[21] Appl. No.: 862,854

[22] Filed: Dec. 21, 1977

Related U.S. Application Data

[62] Division of Ser. No. 642,341, Dec. 19, 1975, Pat. No. 4,078,129.

[30] Foreign Application Priority Data

Dec. 20, 1974 [JP] Japan .................................. 49/147125

[51] Int. Cl.$^2$ ............................................ B01D 21/01
[52] U.S. Cl. .................................................... 210/219
[58] Field of Search ............. 210/219, 221 M; 23/267; 209/168, 169, 170

[56] References Cited

U.S. PATENT DOCUMENTS

| | | | |
|---|---|---|---|
| 809,959 | 1/1906 | Kirby | 209/168 |
| 1,374,499 | 4/1921 | Greenawalt | 209/168 |
| 1,374,500 | 4/1921 | Greenawalt | 209/168 |
| 2,570,079 | 10/1951 | Spremulli | 366/325 |
| 2,639,902 | 5/1953 | Kuebler | 366/325 |
| 3,300,047 | 1/1967 | Hirsch | 210/219 |
| 3,442,386 | 5/1969 | Molm | 210/219 |
| 3,574,331 | 4/1971 | Kurosawa | 210/219 |
| 3,579,443 | 5/1971 | Horst | 210/219 |
| 3,580,550 | 5/1971 | Hunnicutt | 366/343 |
| 3,607,743 | 9/1971 | Visser | 210/219 |
| 3,870,635 | 3/1975 | Clarke-Pounder | 209/168 |
| 4,054,519 | 10/1977 | Tufts | 241/46.17 |

OTHER PUBLICATIONS

McCabe & Smith, Unit Operation of Chem. Engin., McGraw-Hill, 1956, pp. 289–293.

Primary Examiner—Hiram H. Bernstein
Attorney, Agent, or Firm—Armstrong, Nikaido, Marmelstein & Kubovcik

[57] ABSTRACT

An apparatus for coagulating particles of dissolved solids from an aqueous solution is provided. The apparatus includes an upright stirring vessel and a rotatable stirrer. The stirrer includes a substantially vertical shaft having a plurality of flat, radially extending blades secured symmetrically around the shaft such that the flat surfaces of each blade are substantially parallel to the plane of rotation of the blades. A plurality of knives extends upwardly and downwardly from each blade, each knife being a flat piece fixed to the top or underside surface of the blade so as to be approximately perpendicular to the longitudinal direction of the blade to which it is fixed and the flat surfaces of each knife being substantially tangential to the cylindrical plane of rotation of the knife. In a further embodiment of the apparatus, obstructing plates are secured to the inner wall of the vessel so as to obstruct the swirling motion in the solution provided by the stirrer.

4 Claims, 3 Drawing Figures

PROCESS FOR SEPARATING POLYVINYL ALCOHOL FROM ITS SOLUTION

This is a division of application Ser. No. 642,341, filed Dec. 19, 1975, now U.S. Pat. No. 4,078,129.

BACKGROUND OF THE INVENTION

This invention relates to a process for separating or recovering polyvinyl alcohol (hereinbelow it is referred to as PVA) from its solution.

PVA is a water-soluble polymer having various desirable characteristics and has been used in various fields in recent years. Thus, a considerable amount of PVA has been discharged from factories in the form of waste water. PVA has a small Biochemical Oxygen Demand (BOD) and rarely appears to cause problems in waste water treatment; however, it has a large Chemical Oxygen Demand (COD) and is liable to cause a public nuisance to the human health. Therefore, it is desirable to remove PVA from the waste water as completely as possible. Thus, it became necessary to separate and remove PVA even from the waste water containing a small amount of PVA, for example, 0.003 to 3 percent by weight of PVA.

In general, in order to treat the waste water which is liable to cause the public nuisance on account of organic compounds contained therein, various processes have been used such as an activated sludge process, a contact process, or an oxidizing pool process. These processes are based on the principle that the organic compounds in the waste water can be decomposed through the action of aerobic organisms. However, PVA can not be decomposed through the action of common aerobic organisms. Therefore, PVA can not be removed by these processes. An attempt was made to discover a specific microorganism which has a capacity of decomposing PVA and to remove PVA through the action of said microorganism. Another attempt was made to separate PVA from aqueous medium by dissolving it into a liquid hydrocarbon medium. However, these attempts could not be of practical use as each was found to be expensive and uneconomical.

On the other hand, it was contemplated that PVA might be separated by salting out a PVA solution. However, a large amount of salt is required in order to precipitate PVA by salting out from a dilute PVA solution such as from the waste water. Use of such a large amount of salt makes it difficult to carry out the salting process on an industrial scale. Thus, it became necessary to find a process in which PVA can be effectively precipitated by use of less amount of salt.

The reason why a large amount of salt is required in the conventional process is explained in more detail as follows. Anhydrous sodium sulfate is taken as an example of salt in the following explanation, because it is generally used as a salt in the conventional salting process. About 100 milliliters of 30 percent aqueous sodium sulfate solution is needed for separating PVA from 100 milliliters of a 2 percent aqueous PVA solution. Thus, 15 parts of anhydrous sodium sulfate ($Na_2SO_4$) is needed for 1 part of PVA. On the other hand, it is said that the higher a valency of an ion, the bigger a coagulating power of the ion. However, when borax is added to an aqueous PVA solution, PVA is not precipitated, but is only gelled. In other words, when borax alone is added to an aqueous PVA solution, PVA only absorbs water and remains in the solution in a jelly form. Therefore, borax is called as a gelling agent for PVA and is understood as being different from the salting agent. Thus, when inorganic salts are added to an aqueous PVA solution in order to coagulate PVA in the solution, a large amount of the salts is sometimes needed, or the salts do not cause any precipitation, depending on the kinds of the salts. Because of these facts the salting process by which PVA is precipitated did not lead to be carried out in an industrial scale.

The inventor have now discovered that a mixture of borax and sodium sulfate has an excellent property of precipitating PVA, even when the mixture of the borax and sodium sulfate are added to a PVA solution in a relatively small amount in total. The inventors have also discovered, on one hand, that salts of boric acid, not only borax, have generally similar effects on precipitating PVA, and on the other hand, that the other component to be mixed with the salts of boric acid is not restricted to the sodium sulfate, but may be an inorganic acid salt of metal which belongs to the first group or the second group in the periodic table, an inorganic ammonium salt or an inorganic aluminum salt. The inventors have further discovered that water insoluble salts may be used for the inorganic acid salt when alkali such as sodium hydroxide etc. is added. This invention has been completed on the basis of above findings.

This invention relates to a process for separating PVA from its solution which comprises adding (1) a salt of boric acid and (2) an inorganic acid salt of a metal selected from the class consisting of the first group and the second group in the periodic table, an inorganic ammonium salt, or an aluminum salt to an aqueous PVA solution.

In the invention, two kinds of inorganic salts as defined in above (1) and (2) are used, in which the salt of boric acid defined in above (1) is hereinbelow referred to as a gelling agent, and the inorganic acid salt as defined in above (2) is hereinbelow referred to as a salting agent, and a mixture of both gelling agent and salting agent is hereinbelow referred to as a coagulating agent.

It is desirable in carrying out the invention that a great number of minute foams are present in the precipitates of PVA formed from an aqueous PVA solution by adding the coagulating agent. The foams, or finely divided gas bubbles suspended in a liquid, may be introduced into the aqueous solution either by bubbling air into the solution or by agitating the solution vigorously.

Though PVA is satisfactorily separated in a batch system using the coagulating agent according to the invention, a further contrivance is needed for separating PVA in a continuous system. The reason is that, although PVA can be precipitated by adding the coagulating agent when a vessel provided with the conventional stirrer is used, formed precipitates often grow to bulky masses and the masses adhere to walls of the vessel, so that it becomes difficult or impossible to carry out continously such a process. The same difficulty occurs when efforts are made to crush the masses in vessels having conventional blades. Thus, PVA could not be continuously separated in a vessel provided with the conventional stirrer.

DETAILED DESCRIPTION

The inventors have found that PVA can be continuously separated in a vessel with a special stirrer and one or more obstructing plates. The special stirrer stated herein is, for example, a stirrer which is constructed by fixing plural blades around a vertical axis in horizontal and radiant direction and symmetrical relationship, and by setting many knives on the upside or underside of said blades, and by giving each of the knives a plate form which is directed in the direction perpendicular to the blades, so that the blades and the knives cut the masses of precipitate in the aqueous solution when the axis is rotated. On the other hand, the obstructing plate stated herein is, for example, constructed of a plate projecting inwardly from the wall of the vessel to the center of the vessel. The plate acts as a barrier to rotate the aqueous solution by means of the stirrer. It was confirmed that PVA may be continuously separated when the vessel is provided with the stirrer and the obstructing plates, and the stirrer is vigorously rotated. The continuous separating process according to the invention has been completed on the basis of such confirmation.

The continuous process is a process for continuous recovery of PVA which comprises flowing an aqueous PVA solution in a given rate, adding thereto a coagulating agent in a given ratio, immediately thereafter introducing continuously said aqueous solution into a stirring vessel, providing the stirring vessel with obstructing plates and a stirrer, the obstructing plates being protruded from the wall of the vessel to the center of the vessel, the stirrer having an axis provided with plural blades in symmetrical relation around the axis, further each of the blades being provided with a number of knives thereon, each of the knives being in the form of a plate secured to the blade in the direction approximately perpendicular to the longitudinal direction of the blades, rotating the stirrer so that the blades and knives cut PVA masses precipitated from the solution to fine particles, and taking out continuously the PVA particles from said stirring vessel.

Figure 1:
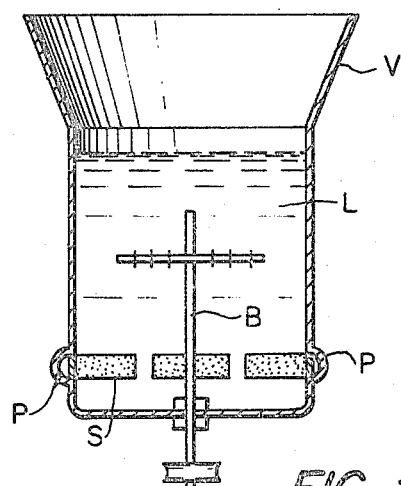
Figure 2:
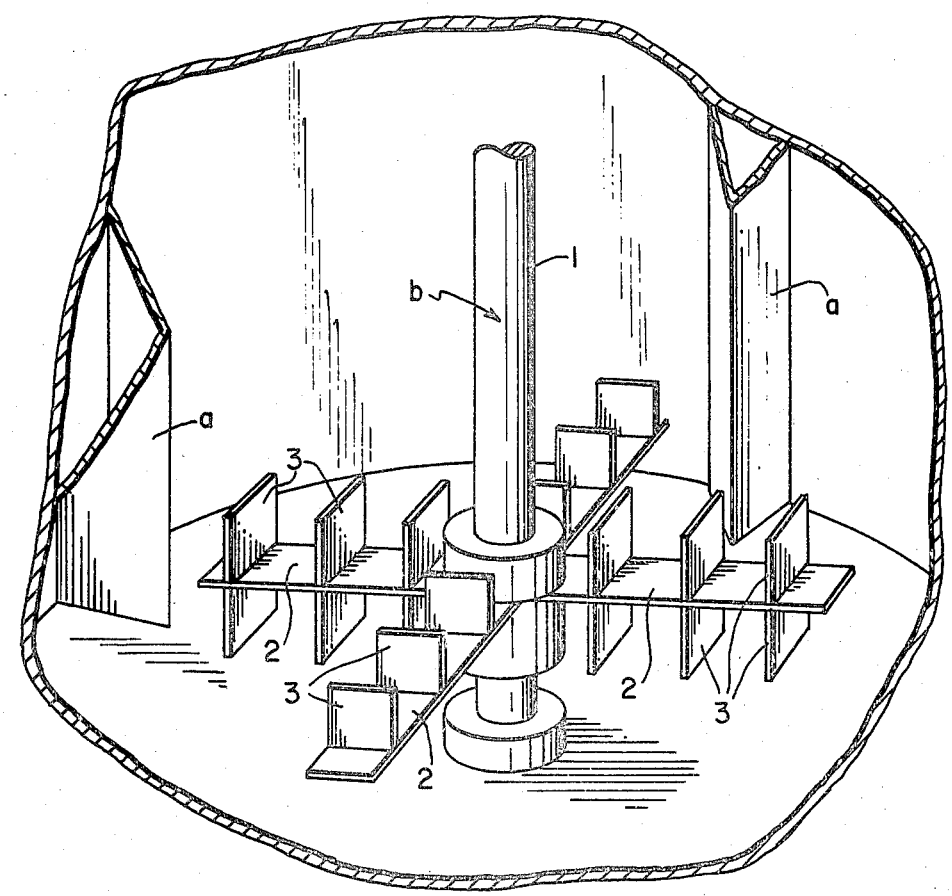
Figure 3:
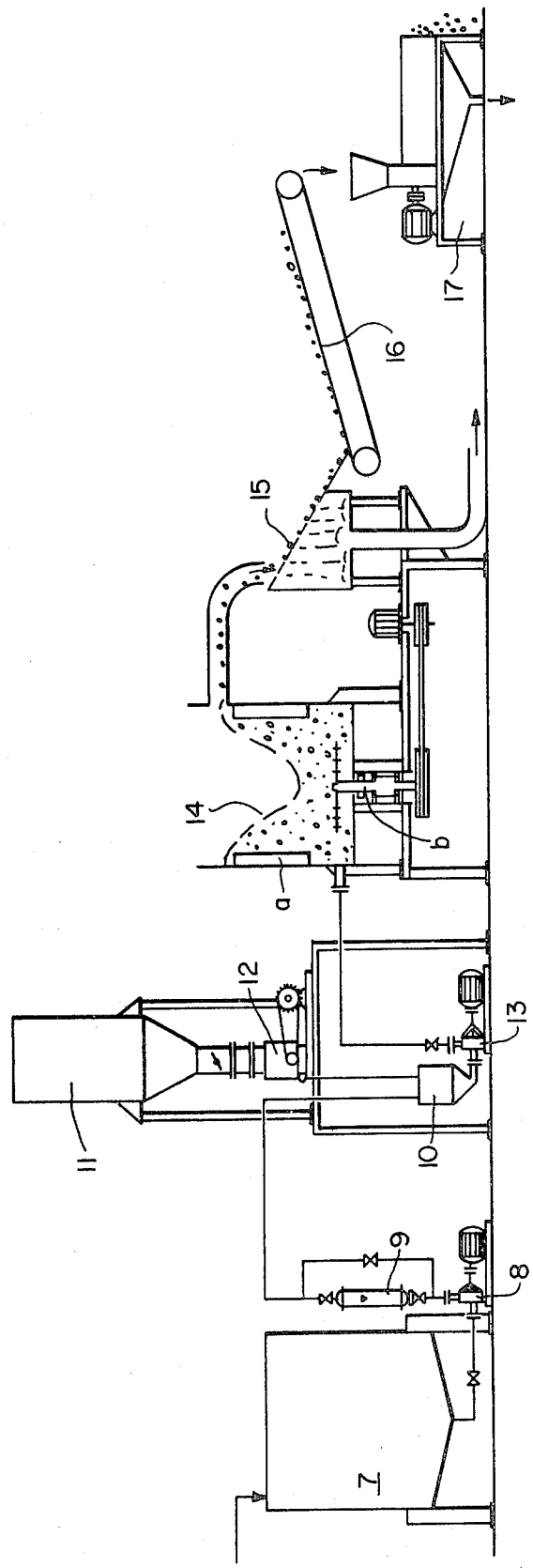

The invention will be illustrated with reference to the accompanying drawings, in which FIG. 1 is a vertical sectional view of a vessel which is used in the invention, FIG. 2 is a fragmentary perspective view of another vessel which is used in the invention, and FIG. 3 is a schematic view of an apparatus which is used for the continuous separation according to this invention.

The aqueous PVA solution which is to be treated according to the invention is a solution discharged as waste water. The solution contains normally about 0.003 to 3 percent by weight of PVA. Though the solution will contain various impurities on account of the inherent property of the waste water, the process of the invention is little affected by the impurities contained therein.

PVA stated herein is not limited to a product which is obtained by completely hydrolyzing polyvinyl acetate, but may be a product which is obtained by partially hydrolyzing polyvinyl acetate in a rate of more than about 70 percent of total ester linkage. PVA may include water soluble copolymers which are obtained by complete or partial hydrolysis of a copolymer prepared by copolymerizing vinyl acetate with a minor amount of ethylene, propylene, maleic acid, acrylic acid, acrylamide or other unsaturated acids. PVA further includes water soluble high polymers which are obtained by partially acetalating or urethanating the polymer or copolymer mentioned above.

The coagulating agent in this invention comprises the gelling agent and the salting agent. As the gelling agent can be commonly used salts of a boric acid, preferably sodium metaborate and sodium orthoborate, most preferably borax. Additionally, potassium metaborate, potassium tetraborate, lithium metaborate, lithium tetraborate, and sodium perborate may be used. These borates should be generally soluble in water, but insoluble or slightly soluble borates may be used together with alkali, if they are changed into water soluble salt of a boric acid by adding alkali. The borate may be used alone or in the form of a mixture of two or more.

The salting agent which is used together with the gelling agent in the invention includes a salt of a metal belonging to the first group or the second group of the periodic table, ammonium salt or aluminum salt of an inorganic acid. The metal belonging to the first group of the periodic table includes lithium, sodium, potassium and copper. The metal belonging to the second group of the periodic table includes magnesium, calcium, zinc and barium. On the other hand, the inorganic acid includes nitric acid, sulfuric acid, sulfurous acid, carbonic acid, phosphoric acid, thiosulfuric acid, hydrohalogenic acid. Thus, the salting agent includes sodium chloride, potassium chloride, sodium sulfate, potassium sulfate, cupric sulfate, aluminum sulfate, zinc sulfate, sodium sulfate, sodium thiosulfate, sodium carbonate, sodium bicarbonate, sodium nitrate, sodium phosphate, potassium phosphate, lithium chloride, lithium sulfate, lithium nitrate, magnesium bromide, magnesium chloride, magnesium sulfate, magnesium nitrate, barium chloride, calcium chloride, aluminum chloride, aluminum sulfate, potassium aluminum sulfate, ammonium chloride, ammonium sulfate, ammonium nitrate, ammonium thiocyanate and ammonium bromide. Among the salting agent are preferably used sodium chloride, potassium chloride, sodium sulfate, potassium sulfate, zinc sulfate, sodium carbonate, magnesium chloride, barium chloride, aluminum chloride, calcium chloride and ammonium sulfate. Inorganic compounds other than the salts mentioned above may be used in combination when they are able to produce the salting agent in water. The salting agent may be used alone or in the form of a mixture of two or more.

The mixing ratio of the gelling agent with the salting agent may be varied over a wide range. For example, the amount of the salting agent to be mixed with 1 part by weight of borate may be varied within the range of about 0.01 to 50 parts by weight, preferably within the range of about 5 to 15 parts by weight. Preferably used is an aqueous solution containing about ten percent of a mixture (coagulating agent) which is prepared by mixing about 10 parts by weight of the salt of the boric acid with about 90 parts by weight of the salting agent. A suitable example is a solution which is prepared by dissolving 9.7 g of ammonium sulfate, 1 g of sodium carbonate and 1.3 g of borax into such amount of water to form the solution having the volume of 100 cc.

It is preferable to add both the gelling agent and salting agent in the form of an aqueous solution to the aqueous PVA solution, but they may be added separately or together in the solid form.

The total weight of the coagulating agent, i.e. the sum of the salts of a boric acid and the salting agent, may be varied according to the amount of PVA dissolved therein. In general, the lower the concentration of PVA, the more coagulating agent is required. The amount of the coagulating agent to be used is increased in the order to ions liberated from the borate and the salting agent, which order is described as the lyotropic series. The total amount by weight is appropriately given to a value within the range from 0.01 to 50 parts by weight to 1 part by weight of dry PVA.

It is preferable that the PVA solution has a pH value of 7 to 10 when it is treated according to the invention. If the solution has a pH less than 7, some of the gelling agents and the salting agents are decomposed and it sometimes impossible to treat the solution according to the invention. It is also preferable that the PVA solution is at a somewhat low temperature because PVA has a tendency to be gradually more unaccomodating in forming a precipitate as the temperature is elevated. It is desirable that the PVA solution is at a temperature in the range from 20° to 40° C. So long as the temperature is within the range, PVA forms precipitates almost in the same manner. PVA forms the precipitates only if the solution is well stirred after the gelling agent and the salting agent have been added. The precipitates may be separated by decanting or filtering the solution, unless continuous operation is intended.

According to the invention, PVA is easily and rapidly separated in the form of precipitates by use of small amounts of the gelling agent and the salting agent, even from a dilute PVA solution. Concretely stated, in order to precipitate PVA from aqueous solution containing 2 percent by weight of PVA, it is required to use 15 parts by weight of sodium sulfate per 1 part by weight of PVA when aqueous sodium sulfate solution alone is used, while, it is sufficient to use only 0.25 part by weight of borate and 0.6 part by weight of sodium sulfate per 1 part by weight of PVA, when both the borate and sodium sulfate are used according to the invention. For example, PVA can be precipitated from 1000 ml of aqueous solution containing 0.75 percent by weight of PVA according to the invention, when 80 ml of the solution is added thereto which is prepared by dissolving 1.5 g of anhydrous sodium sulfate and 1 g of borax into 1000 ml of water. In this case, the amount of the agent to be added is reduced to one tenth of the amount needed when sodium sulfate alone is used. Another advantage of this invention is that PVA can be reliably separated from various aqueous solutions having a wide variety of PVA concentrations from 30 to 30,000 ppm, with an excellent recovery yield as high as about 95 percent by weight. Consequently, there is less fear of causing public nuisance to human health according to the invention.

In order to introduce a number of minute foams into an aqueous PVA solution while PVA is being precipitated, an apparatus as shown by FIG. 1 may be used. In FIG. 1, a blade stirrer B is provided in a vessel V in which PVA solution L is contained. In a lower part of vessel V, a pipe P surrounds vessel V and is secured to the wall of vessel V. Sheets of urethane sponge S are provided on the wall of vessel V at positions where pipe P is secured. Thus, when the compressed air is introduced into pipe P, the air is expelled from pores of sheets S to form a number of minute bubbles in the solution in vessel V. Thus a number of minute air bubbles are introduced into PVA solution L. Sheets S may be replaced by perforated plates of stainless steel. Alternatively, pipe P may be inserted in the solution L and the air may be expelled from pipe P.

Alternatively, the air may be introduced into the solution to form bubbles therein by a vigorous stirring of the solution. The vigorous stirring stated herein means that, in short, turbulent flow is generated in the solution so that the turbulent flow carries the air into the inner portion of the solution. The generation of an effective turbulent flow is affected greatly by the blade shape of the stirrer. It is preferable to use blades provided with cutters having a powerful cutting ability. The blade must rotate at a high speed in order to generate the turbulent flow which brings the air into the inner portion of the solution. When the blades are rotated at low speed, PVA particles are precipitated in the state of a paste of large particle sizes, while, when the stirrer or the blades are rotated at high speed, PVA particles are changed to smaller particles and hydrophilic colloids as the number of rotations are increased. In the case wherein the blades are rotated at such a high speed that the Reynolds' Number exceeds 4th power of ten ($10^4$), the PVA particles have the hydrophilic state of a sponge, and in the case where the Reynolds' Number exceeds 5th power of ten ($10^5$), the PVA particles become further finer and finer. Thus, the stirring in this invention is different from the conventional stirring in the respect that the stirring carries air even into the inner portion of the solution.

It is preferable to introduce the air so as to produce as many foams as possible which are as minute as possible. When the air is expelled from the sponge sheet as mentioned above, foams are formed which are minute in size and great in number, and therefore such method is preferable. If the air is introduced in such a manner as mentioned above, then it is not required to stir the solution. However, when the solution is stirred while the air is being introduced, a better result may be obtained. Stirring in this case is not required to be a vigorous stirring, but may be an ordinary stirring.

PVA tends to form masses or lumps in the state of a paste and to float or precipitate in the solution when the coagulating agent, i.e. the gelling agent together with the salting agent, is added to the PVA solution and is left without receiving further operation. However, it takes much time and labor to convert the masses or lumps in the state of a paste into the form of a reproduced or appropriate waste material. More precisely, the pasty masses, when precipitated from the solution, contain much water and therefore should be taken out from the solution and dried. It is troublesome to take out and to dry the masses. For example, when a centrifuge is used for taking out the masses, the masses adhere to the inner wall of the rotator and it becomes difficult to remove the masses. Besides, it takes much time and labor to dry the masses because each of the masses has a big particle size. If the masses are to be crushed, an additional troublesome process such as a crushing process is required.

However, when the air is blown to form a number of fine foams in PVA solution, formed precipitates of PVA do not grow to big masses but remain as fine particles. The fine particles normally adsorb a number of foams. Because of the resulting decrease in density, the particles are floated up to the solution surface. The resultant particles have less adhesive power than the big masses and can be easily separated from the solution. Similarly, the particles floated up to the solution surface have less adhesive powers and can be more easily separated since they are floated on the solution surface. The particles can be dried in a short period of time after being separated. Introduction of a number of foams brings about such advantages as mentioned above.

To carry out continuously the process of the invention, the coagulating agent is continuously added to PVA solution. It is preferable that PVA solution flows from a reservoir of PVA solution, that coagulating agent solution is mixed with the flowing PVA solution at a given rate, and that the mixed solution is then conveyed to a stirring vessel. PVA precipitate is not formed from the PVA solution immediately after the coagulating agent has been added to the solution, but the precipitate appears in the solution after a short time has passed. In the continuous process according to the invention, the precipitation of PVA is preferably carried out using a stirring vessel which is described below.

The stirring vessel is provided with obstructing plates and a stirrer. FIG. 2 shows a framentary perspective view of the stirring vessel, wherein an example of the obstructing plates and an example of the stirrer are shown. In FIG. 2, a denotes obstructing plates and b denotes a stirrer. Each obstructing plate a is made of a plate, which is bent in the width direction to have a V-shaped section. Each obstructing plate is secured to the inner wall of the vessel, so that both open edges of the V are attached to the inner wall of the vessel, a tapering edge of the V is directed to the center of the vessel, and the longitudinal direction of the plate is parallel to the axis of the vessel. In another example, each obstructing plate may be a mere flat plate. In short, the obstructing plates may be in any shapes that have a function to obstruct rotating movement of the liquid caused by the rotation of the stirrer and to give rise to a turbulent flow in the liquid.

FIG. 2 shows stirrer b, which has the following structure. Numeral reference 1 denotes an axis, 2 denotes blades secured to axis 1, and 3 denotes knives secured to blades 2. Blades 2 are flat bands symmetrically secured around axis 1. Blades 2 are rotated by rotating axis 1. Each of blades 2 is secured in such a manner that both flat surfaces of each of blades 2 are approximately parallel to the rotating direction, so that the blades when rotated have the least resistance to the rotation and cut the liquid most effectively in the vessel. Knives 3 are flat pieces or plates fixed to the top or underside surface of blades 2. Knives 3 are also rotated by rotating blades 2. Both flat surfaces of knives 3 are approximately perpendicular to the longitudinal direction of blade 2 so that when rotated the knives have the least resistance to the rotation and cut the liquid in the vessel most effectively. Thus, the liquid in the vessel is agitated by both the blades and knives when axis 1 is rotated, and at the same time is cut by both the blades and knives.

Blades 2 may be secured to axis 1 like ribs in an umbrella. The flat surface of knives 3 may be inclined to blades 2 in the up-and-down direction. Knives 3 may be secured merely to one side, that is only upside or underside, or both sides of individual blade 2. It is desirable that each of blades 2 has a length more than one third of the inner radius of the vessel.

It is preferable that the PVA solution is continuously introduced into the stirring vessel from the lower part thereof. It is also preferable that, at this time, the PVA solution is in such a state that the coagulating agent has been added and the precipitation of PVA is imminent. As PVA precipitates in the lower part of the stirring vessel under these conditions, blades and knives are desirably positioned in the lower part of the stirring vessel. Therefore, it is preferable to allow the lower end of the axis to extend through the bottom of the vessel and to rotate the stirrer by driving the lower end of the axis. In this case, it is also preferable to allow the precipitated PVA particles to flow from the upper part of the vessel.

On carrying out the continuous process of this invention, it is advantageous that the stirrer is vigorously rotated in the stirring vessel. The vigorous rotation should be far greater than the normal rotating power used in conventional stirring. The rotating power may be roughly represented by the number of horsepowers of a motor used for rotating the stirrer. Thus, when the rotating power is explained by means of the number of horsepowers of the motor, vigorous rotating power means more than several times, preferably more than ten times, as much as the number of horsepowers of a motor used in the conventional stirring. When the vigorous stirring is explained by means of rotating energy, the vigorous stirring means a stirring wherein a solution is stirred by more than 0.01 KW energy per 1 liter of the solution. The rotating energy value may be practically determined by dividing energy difference (KW) by volume (liter) of the solution. The energy difference is calculated as a difference of two energy values: that is, an energy value which is spent by stirring the solution in the vessel under certain conditions, minus another energy which is spent by rotating the stirrer in the empty vessel. In order to carry out the vigorous stirring it is desirable to make stirring in which a rotating energy of more than 0.01 KW is spent per liter of liquid.

The vigorous stirring is intended to draw or carry foams of the air to PVA precipitates and also intended to crush the PVA precipitates.

PVA precipitation occurs in PVA solution in a short time after the PVA solution containing the coagulating agent has been conveyed into the stirring vessel. The stirring vessel is provided with a stirrer, and when the stirrer is vigorously rotated, PVA precipitates are cut by blades of the stirrer and knives on the blades. Since the stirring vessel is provided with obstructing plates, the solution and the precipitates in the vessel are disturbed by collision against obstructing plates, and the precipitates are cut more effectively by both the blades and knives of the stirrer. Thus the precipitates cannot remain big masses but are divided into particles of small size and the precipitates are floated in the solution with foams of air.

It is desirable that many foams be present in the solution while PVA is being precipitated in the stirring vessel. Production of numerous foams may happen spontaneously when the stirrer is rotated and causes turbulent flow in the solution, by which foams are drawn into the inner portion of the solution.

However, if the foams are insufficient in quantity, it is preferable to provide the stirring vessel with a means for blowing the air in the vessel. The means for blowing the air is preferably of the structure that perforations are provided on an air pipe secured to the inside or inner wall of the vessel, and the air is expelled from the perforations.

The solution, in which the fine particles of PVA precipitates have been floated, flows over the top of the vessel and is discharged continuously from the vessel. The solution discharged is then put onto a sloped net, by which only the particles are captured and the liquid is passed downward. The particles remaining on the net are conveyed along the net, charged into a dehydrater and dehydrated therein.

A screwpress may be used as the dehydrater. PVA is taken out from the screwpress in the form of particles. The particles are then charged in a drier and dried to be a final recovery form.

An embodiment of the apparatus used in the continuous process will be explained below with reference to the accompanying drawing. FIG. 3 shows an example of the apparatus which is used for carrying out the continuous process of the invention. In FIG. 3, numeral reference 7 denotes a tank for PVA solution, 8 denotes a pump and 9 denotes a flowmeter. All of them are provided in order to supply the PVA solution in a given rate. Numeral reference 10 denotes a tank for mixing PVA solution with a solution of the coagulating agent, 11 denotes a tank for storing the solution of the coagulating agent, and 12 denotes a constant supplying means of the coagulating agent. Numeral reference 13 denotes a pump, 14 denotes a stirring vessel, a denotes obstructing plates, b denotes a stirrer, 15 denotes a screen, 16 denotes a conveyer belt and 17 denotes a screwpress.

In a mixing tank 10, the coagulating agent is added to the PVA solution, which is conveyed into stirring vessel 14 by pump 13. Then, the precipitation of PVA occurs. In stirring vessel 14, the solution is vigorously stirred by the action of obstructing plates a and stirrer b, and the precipitates of PVA are crushed into fine particles by such stirring. The particles are floated in the solution without adhering to the inner surface of the vessel. The floating PVA particles flow out from stirring vessel 14 together with the solution and are conveyed onto screen 15 by which the particles are separated from the solution. The separated PVA particles are conveyed by conveyer belt 16, fed in screwpress 17 and dehydrated to be a solid having a water content of 80 to 550 percent. Thus, PVA is recovered as a solid which may be burned off without further treating or may be used again as a material after drying in a dryer if necessary.

Though only one stirring vessel 14 is provided in the apparatus described above, yet two, three or more stirring vessels may be provided in series or in parallel when a single stirring vessel is insufficient for recovering PVA.

According to the process or apparatus of this invention, PVA is obtained in a solid state by adding continuously the coagulating agent to PVA solution, conveying continuously thus formed mixture into a stirring vessel, precipitating PVA continuously in the form of particles and separating continuously the particles. The process and apparatus of the invention has a great practical advantage in the respect that they allow a continuous separation of PVA from an aqueous PVA solution.

For a better understanding of the invention, a detailed description will be given below by way of examples.

EXAMPLE 1

To 1000 ml of an aqueous solution which contained 7500 ppm of PVA (average degree of polymerization was 1700 and degree of saponification was 88.0±1.0) was added 80 ml of a solution which was prepared by dissolving 15 g of anhydrous sodium sulfate and 1 g of borax into water and adjusting the total volume to 1000 ml. When the resultant mixture was then stirred for about 15 to 20 minutes with a magnetic stirrer, about 94 percent by weight of total PVA was coagulated. The coagulated PVA was filtered off with a glass filter (IG-2). The filtrate had a COD of 450 ppm.

EXAMPLE 2

To 1000 ml of an aqueous solution which contained 7000 ppm of PVA (average degree of polymerization was 500 and degree of saponification was 88.0±1.0) was added 120 ml of a solution which was prepared by dissolving 15 g of potassium sulfate and 2 g of potassium metaborate into water and adjusting the volume to 1000 ml. When the resultant mixture was then stirred for 5 minutes with a glass rod, about 96% by weight of total PVA was coagulated. The coagulated PVA was filtered off with a glass filter (IG-2). The filtrate had a COD of 280 ppm.

EXAMPLE 3

5 g of PVA (average degree of polymerization was 1700 and degree of saponification was 98.5±1.0) and 5 g of starch (cornstarch) was dispersed in water and thus formed dispersion was heated until it became a solution. Warmed water was added to the solution adjusting the total volume to 1000 ml. To the solution was added 0.97 g of a mixture which was prepared by mixing 10 parts by weight of anhydrous sodium sulfate with 1 part by weight of borax in a mortar. When the solution was thereafter stirred for about 15 minutes with a magnetic stirrer, PVA alone was coagulated.

The coagulated PVA, which was separated from the solution, was heated and dissolved into water and the resultant solution was concentrated by steam-heating to have a concentration of about 20%. An excess amount of methanol was added to precipitate PVA, which was dissolved into water again and re-precipitated with methanol, to give precipitates free from borates and other salts. The precipitates were dried at 105° C. and weighed. As a result, 4.65 g of PVA was recovered. This means about 93 percent by weight of PVA was coagulated from the mixed solution of PVA and starch.

EXAMPLE 4

To 100 ml of an aqueous solution which contained 2 g of PVA (average degree of polymerization was 1700 and degree of saponification was 99.5±1.0) was added 100 ml of a solution which was prepared by dissolving 3 g of borax into 1000 ml of sea water (contained NaCl, KCl, $MgCl_2$ etc.). The resulting solution was stirred sufficiently, allowed to stand for 30 minutes and treated in the same manner as Example 3 to remove borates and other salts to give 1.9 g of dry PVA. This means PVA was separated in a yield of about 95 percent by weight from the PVA solution.

EXAMPLE 5

To 1000 ml of an aqueous solution which contained 200 ppm of PVA (average degree of polymerization was 2450) were added directly 5.6 g of aluminium sulfate and 0.4 g of borax. The resulting solution was stirred for about 30 minutes with a magnetic stirrer while the air was blown and bubbled into the solution. When the solution was then allowed to stand for about 10 hours at 20° C., about 90 percent by weight of PVA was coagulated. The coagulated PVA was filtered off with a glass filter (IG-2). The filtrate had a COD of about 20 ppm.

EXAMPLE 6

In this example a process was conducted in which PVA was continuously precipitated. The apparatus shown in FIG. 3 was used in this example.

An aqueous solution which contained 15800 ppm of PVA (average degree of polymerization was 1700 and degree of saponification was 98.5±1.0) was charged continuously into an mixing vessel of hopper type in a rate of 50 liter per minute. Powdery mixture of anhydrous sodium sulfate and borax (the ratio of anhydrous sodium sulfate to borax was 15 to 1) was added to the solution in the vessel in a rate of 500 g per minute and they were uniformly mixed.

Immediately after the mixing, the mixed solution was charged into a stirring vessel. The stirring vessel was 900 mm in diameter, 1100 mm in height, and provided with a stirrer at the central position and four obstructing plates at the symmetrical position on the wall. These were substantially the same as shown in FIG. 2, except that six knives 3 were fixed to both upside and underside of each of blades 2.

The mixed solution was introduced into the stirring vessel from an inlet provided on the lower part near to the bottom of the vessel and overflowed from an outlet provided at a height of 700 mm from the bottom of the vessel. While the solution was being passed through the vessel, the stirrer was rotated at a rate of 1500 r.p.m. and thus the solution was vigorously stirred. As a result, the solution was maintained in the state that the solution held a number of foams of the air and PVA was crushed by the stirrer into particles of about 1 mm in particle size, which were discharged from the vessel in the state of a suspension. PVA particles thus obtained were dehydrated, dried and recovered continuously in the form of particles of 2 mm in particle size.

We claim:

1. An apparatus for coagulating particles of dissolved solids from an aqueous solution which comprises an upright stirring vessel provided with a stirrer and a plurality of obstructing plates disposed vertically along the inner wall of said vessel, the stirrer comprising a substantially vertical shaft, a plurality of flat, radially extending blades secured symmetrically around said shaft in such a relation that both flat surfaces of each blade are substantially parallel to the plane of rotation of the blades, a plurality of knives extending upwardly and downwardly from said blades, each knife being a flat piece fixed to the top or underside surface of said blades in such a relation that each knife is approximately perpendicular to the longitudinal direction of the blade to which the knife is fixed and the flat surfaces of each knife being substantially tangential to the cylindrical plane of rotation of the knife, said obstructing plates being secured to the inner wall of the vessel so as to obstruct the swirling motion in the solution provided by the stirrer.

2. The apparatus as recited in claim 1, wherein the stirring vessel is provided with a pipe and sheets of plastic sponge on the inside wall in a lower part of the vessel so that air from the pipe is blown through the sheets into the vessel.

3. The apparatus which comprises in combination
   (a) the apparatus as recited in claim 1,
   (b) a vessel for holding an aqueous solution containing solids dissolved therein,
   (c) a vessel for holding a coagulating agent,
   (d) means for continuously adding the coagulating agent at a controlled rate to the solution,
   (e) means for continuously conveying the resulting mixture to the stirring vessel,
   (f) means for rotating the stirrer to produce the swirling motion in the mixture,
   (g) means for continuously overflowing the mixture over the stirring vessel, and
   (h) means for screening the mixture to obtain particles.

4. Apparatus for coagulating particles of dissolved solids from an aqueous solution which comprises an upright stirring vessel provided with a stirrer comprising a substantially vertical rotatable shaft extending vertically into said vessel and having a plurality of flat arms mounted symmetrically thereon and extending radially outwardly from said shaft and having both flat surfaces of each blade substantially parallel to the plane of rotation of the blades, and a plurality of knives mounted on said arms and extending vertically upwardly and downwardly therefrom and rotatable about said shaft in a plane substantially parallel to the axis of rotation of said shaft, and having the flat surfaces of each knife oriented substantially tangent to cylindrical plane of rotation of the knife.

* * * * *